Patented June 1, 1937

2,082,044

UNITED STATES PATENT OFFICE 2,082,044

PROCESS FOR PREPARING TERTIARY ALKYL PHENOLS

Clayton M. Beamer, Elizabeth, N. J., assignor to Standard Oil Development Company, a corporation of Delaware No Drawing. Application February 16, 1932, Serial No. 593,414

6 Claims. (Cl. 260—154)

This invention relates to a new method of preparing tertiary alkyl hydroxy aromatic compounds such as tertiary alkyl phenols, cresols, resorcinols or other hydroxy compounds including such compounds containing condensed nuclei, as naphthols.

According to this invention tertiary alcohols are caused to react with phenols in the presence of a catalytic dehydrating agent, under carefully controlled conditions to prevent polymerization and other undesirable side reactions, to form a product consisting largely of the corresponding tertiary alkyl phenols, that is, an alkyl phenol in which the carbon atom of the alkyl radical attached to the aromatic nucleus is also attached to three other alkyl carbon atoms. Among the products which may be produced by this reaction are the tertiary butyl, amyl, hexyl, heptyl and octyl phenols which are produced from the corresponding tertiary alcohols and phenols. Similarly tertiary alkyl cresols, resorcinols, catechols, quinols, pyrogallols, phloroglucinols and other phenolic compounds may be prepared from the corresponding phenols and the tertiary alcohols.

These compounds may be prepared by reaction of tertiary alcohols and phenols under controlled conditions in the presence of concentrated sulfuric acid. The resulting mixture is then diluted with water to separate the alkyl phenol. In the case of normally solid products such as tertiary butyl phenol, the product is precipitated in a crystalline form by this dilution with water and may be obtained in a very pure state simply by filtration and subsequent washing with water. Where the product is an oily liquid such as the higher alkyl derivatives, it may be separated and purified after the reaction by other known methods such as extraction with aqueous alkaline solutions, subsequent acidification of the extract, and separation of the phenols from the acidified extract. Both the tertiary butyl phenol and the higher derivatives may also be additionally purified by steam distillation. Superheated steam at about 150° C. is preferably used. The distillate, containing the alkyl phenol, may be condensed by direct contact with water. The impurities distilling over go into solution in the water, from which the product may be separated readily.

The following example illustrates the use of this process in the production of tertiary butyl phenol: One molecular equivalent (calculated on phenol) of sulfuric acid of 95% concentration is cooled to 5° C. by refrigeration while agitating in a mixer. A mixture containing 1 mol. of phenol and 0.88 mol. of tertiary butyl alcohol both substantially anhydrous is slowly poured into the cold sulfuric acid with continued agitation and cooling so that the temperature of the acid does not rise above 10° C. The mixture is then agitated for a short time, say about one-half hour, following which 1 mol. equivalent of 95% sulfuric acid is added with continued agitation and cooling to maintain the temperature below 15° C. Agitation is continued after this addition for a further period of about one-half hour at 10–15° C. and is then stopped. The mixture is allowed to warm up to about 30–40° C. permitting the separation of a lower layer containing acid which is drawn off and may be concentrated for reuse. Small amounts of unreacted phenols may be recovered from this acid, if desired. The upper layer, constituting the reaction product, is then run into cold water (1 to 20 dilution) with vigorous mixing. The temperature of the water is about 20° C. and is preferably below 30 to 40° C. A few hours are allowed for crystal growth and to complete the precipitation which occurs on the dilution with water. The diluted reaction mixture is then filtered and the crystal precipitate is washed with water on the filter until the filtrate is clear. The yield is 50 to 80% of tertiary butyl phenol calculated on the tertiary butyl alcohol used. The product, dried in warm air, melts at 97 to 99° C.

The optimum temperature for the above described alcohol and phenol reaction is about 7 to 10° C., although higher or lower temperatures may be used. In general, it is preferred to maintain the temperature of the reaction mixture below about 15° C. until the reaction is complete, which may be determined by diluting a small sample with water. When a clean crystalline precipitate forms, with no separation of an oily product, the reaction is complete.

The sulfuric acid used in the above process should be concentrated and is preferably above about 93% acid. Acid of 98% concentration, or even higher, may be used. The amount of acid required depends upon the concentration of the acid and is best determined by experiment. Also, while very desirable results are obtained by using the acid in two portions as described above, in which the reagents are added to one mol. equivalent of 95% acid and a second mol. equivalent of acid is subsequently added, the reagents may be added to the total amount of acid to be used, or other variations may be used in the procedure, all of which are considered within the scope of this invention.

The reaction may also be conducted in the presence of other catalytic dehydrating agents, such as zinc chloride and the like, which may be used in addition to or in place of sulfuric acid.

My invention is not to be limited by any theory of the operation of this process nor by any examples given herein solely for illustrative purposes but only by the following claims in which I wish to claim all novelty insofar as the prior art permits.

I claim:

1. An improved process for the production of tertiary alkyl phenols from a tertiary alcohol and a phenol comprising reacting the tertiary alcohol and phenol in the presence of concentrated sulfuric acid, maintaining the reacting mixture throughout the reaction at a temperature below about 15° C.

2. Process according to claim 1 in which the strength of said concentrated sulphuric acid is in the range of 93% to 98%.

3. Process according to claim 1, in which the strength of said concentrated sulphuric acid is about 95%.

4. An improved process for the production of tertiary alkyl phenols comprising slowly bringing a mixture of a tertiary alcohol and a phenol into contact with sulfuric acid of above 93% concentration, while continuously agitating and cooling the reacting mixture to prevent the temperature rising above 15° C. and separating as a product a tertiary alkyl phenol.

5. An improved process for the production of tertiary alkyl phenol comprising slowly bringing a mixture of a tertiary alcohol and phenol into contact with sulfuric acid of above 93% concentration, while continuously agitating and cooling the reaction mixture to prevent the temperature rising above about 15° C., subsequently warming the reaction mixture to about 30 to 40° C., to cause a separation into layers, withdrawing the upper layer, diluting it with cold water, and separating the product therefrom.

6. An improved process for the production of tertiary butyl phenol comprising bringing a mixture of phenol and tertiary butyl alcohol into contact with sulfuric acid of a concentration above about 93%, while maintaining the temperature below about 10° C., adding additional sulfuric acid of a concentration above about 93%, while warming the mixture to about 15° C. to complete the reaction, subsequently warming the mixture to about 30 to 40° C. to cause a separation into layers, withdrawing the upper layer, diluting it with cold water to cause the formation of a crystalline precipitate comprising tertiary butyl phenol, and separating said precipitate from the water mixture.

CLAYTON M. BEAMER.